(12) United States Patent
Ji et al.

(10) Patent No.: US 9,797,480 B2
(45) Date of Patent: Oct. 24, 2017

(54) PLANETARY GEAR TRAIN OF AUTOMATIC TRANSMISSION FOR VEHICLES

(71) Applicant: Hyundai Motor Company, Seoul (KR)

(72) Inventors: Seongwook Ji, Ansan-si (KR); Sueng Ho Lee, Seoul (KR); Jae Chang Kook, Hwaseong-si (KR); Dong Hwan Hwang, Seoul (KR); SeokJin Kim, Hwaseong-si (KR); Wonmin Cho, Hwaseong-si (KR); Hyun Sik Kwon, Seoul (KR); JongSool Park, Hwaseong-si (KR); KyeongHun Lee, Seoul (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 30 days.

(21) Appl. No.: 14/942,288

(22) Filed: Nov. 16, 2015

(65) Prior Publication Data

US 2017/0074361 A1   Mar. 16, 2017

(30) Foreign Application Priority Data

Sep. 14, 2015 (KR) ........................ 10-2015-0129857

(51) Int. Cl.
    *F16H 3/66* (2006.01)
(52) U.S. Cl.
    CPC ....... *F16H 3/66* (2013.01); *F16H 2200/0069* (2013.01); *F16H 2200/2012* (2013.01);
    (Continued)

(58) Field of Classification Search
    CPC ..... F16H 2200/2012; F16H 2200/2046; F16H 2200/2097
    See application file for complete search history.

(56) References Cited

U.S. PATENT DOCUMENTS

| 8,690,722 B2 | 4/2014 | Phillips et al. |
| 2016/0061298 A1 * | 3/2016 | Beck ........................ F16H 3/66 475/275 |

(Continued)

FOREIGN PATENT DOCUMENTS

| DE | 10200905445 | * | 6/2011 |
| JP | 2015-25519 A | | 2/2015 |

(Continued)

*Primary Examiner* — Sherry Estremsky
(74) *Attorney, Agent, or Firm* — Morgan, Lewis & Bockius LLP

(57) ABSTRACT

An automatic transmission for a vehicle may include an input shaft; an output shaft; first to fourth planetary gear sets and six control elements which are disposed between the rotating elements, and disposed at portions where the rotating elements are selectively connected to a transmission housing, in which the input shaft is directly connected with the second rotating element, the output shaft is directly connected with the eleventh rotating element, the first rotating element is directly connected with the seventh rotating element, the sixth rotating element is directly connected with the transmission housing, the fourth rotating element is directly connected with the ninth rotating element, the eighth rotating element is directly connected with the tenth rotating element, and at least ten forward speeds and one reverse speed are implemented by operations of three control elements among the six control elements.

9 Claims, 2 Drawing Sheets

(52) U.S. Cl.
    CPC ............... *F16H 2200/2046* (2013.01); *F16H 2200/2097* (2013.01)

(56) References Cited

U.S. PATENT DOCUMENTS

2016/0258514 A1* 9/2016 Cho .......................... F16H 3/66
2016/0333983 A1* 11/2016 Briceno ................... F16H 3/66

FOREIGN PATENT DOCUMENTS

JP  2015-155721 A  8/2015
KR  10-2011-0131816 A  12/2011

\* cited by examiner

FIG. 2

| Gear shift stages | C1 | C2 | C3 | C4 | B1 | B2 | Gear ratio | Ratio between gear shift stages | Total gear ratio |
|---|---|---|---|---|---|---|---|---|---|
| D1 | | | ● | ● | ● | | 4.124 | | |
| D2 | | | | ● | ● | ● | 2.676 | 1.541 | |
| D3 | ● | ● | | ● | | ● | 2.055 | 1.302 | |
| D4 | ● | ● | | ● | | | 1.533 | 1.341 | 9.636 |
| D5 | | ● | ● | ● | | | 1.194 | 1.284 | |
| D6 | ● | ● | ● | | | | 1.000 | 1.194 | |
| D7 | | ● | ● | | ● | | 0.792 | 1.263 | |
| D8 | | ● | ● | | | ● | 0.636 | 1.245 | |
| D9 | | ● | | | ● | ● | 0.514 | 1.238 | |
| D10 | ● | ● | | | ● | | 0.428 | 1.200 | |
| REV | | | ● | ● | | ● | -5.250 | | |

PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2015-0129857 filed on Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle, which is capable of implementing ten forward speeds using a minimum number of configurations, improving power transmission performance and fuel efficiency by increasing a span of a gear shift ratio, and ensuring uniformity (linearity of graph) of ratios between gear shift stages.

Description of Related Art

The recent increase in oil prices causes carmakers to meet global demands of improving fuel efficiency.

Accordingly, researches are being conducted on engines in terms of reducing weight and improving fuel efficiency by down-sizing, and researches are also being conducted to ensure both drivability and competitiveness by maximizing fuel efficiency by implementing an automatic transmission with multiple stages.

However, in the case of the automatic transmission, the number of internal components is increased as the number of gear shift stages is increased, which may cause deterioration in terms of mountability, costs, weight and power transmission efficiency.

Therefore, in order to increase an effect of improving fuel efficiency by implementing an automatic transmission with multiple stages, it is important to develop a planetary gear train capable of maximizing efficiency using a small number of components.

In this respect, recently, an eight-speed automatic transmission has been implemented, and researches and developments are being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

Therefore, because it is impossible to ensure uniformity (linearity of graph) of ratios between gear shift stages in a case in which a span of a gear shift ratio in the case of the eight-speed automatic transmission is increased to 9.0 or more, driving efficiency of the engine and drivability of the vehicle deteriorate. Accordingly, there is a need for development of a highly efficient automatic transmission with the gear shift stages for nine or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which is capable of implementing gear shift stages for ten forward speeds and one reverse speed using a minimum number of configurations, improving power transmission performance and fuel efficiency by increasing a span of a gear shift ratio, and ensuring uniformity (linearity of graph) of ratios between the gear shift stages.

An exemplary embodiment of the present invention provides a planetary gear train of an automatic transmission for a vehicle, the planetary gear train including: an input shaft which receives power from an engine; an output shaft which outputs power changed in speed; a first planetary gear set which has first, second, and third rotating elements; a second planetary gear set which has fourth, fifth, and sixth rotating elements; a third planetary gear set which has seventh, eighth, and ninth rotating elements; a fourth planetary gear set which has tenth, eleventh, and twelfth rotating elements; and six control elements which are disposed between the rotating elements, and disposed at portions where the rotating elements are selectively connected to a transmission housing, in which the input shaft is directly connected with the second rotating element, the output shaft is directly connected with the eleventh rotating element, the first rotating element is directly connected with the seventh rotating element, the sixth rotating element is directly connected with the transmission housing, the fourth rotating element is directly connected with the ninth rotating element, the eighth rotating element is directly connected with the tenth rotating element, and at least ten forward speeds and one reverse speed are implemented by operations of three control elements among the six control elements.

The third rotating element and the fourth rotating element may be selectively connected with the transmission housing, the second rotating element may be selectively connected with the eighth rotating element, the seventh rotating element may be selectively connected with the twelfth rotating element, the third rotating element may be selectively connected with the eighth rotating element, and the fifth rotating element may be selectively connected with the twelfth rotating element.

The first, second, and third rotating elements of the first planetary gear set may be a sun gear, a planet carrier, and a ring gear, respectively, the fourth, fifth, and sixth rotating elements of the second planetary gear set may be a sun gear, a planet carrier, and a ring gear, respectively, the seventh, eighth, and ninth rotating elements of the third planetary gear set may be a sun gear, a planet carrier, and a ring gear, respectively, and the tenth, eleventh, and twelfth rotating elements of the fourth planetary gear set may be a sun gear, a ring gear, and a planet carrier, respectively.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to an exemplary embodiment of the present invention.

Figure 1:
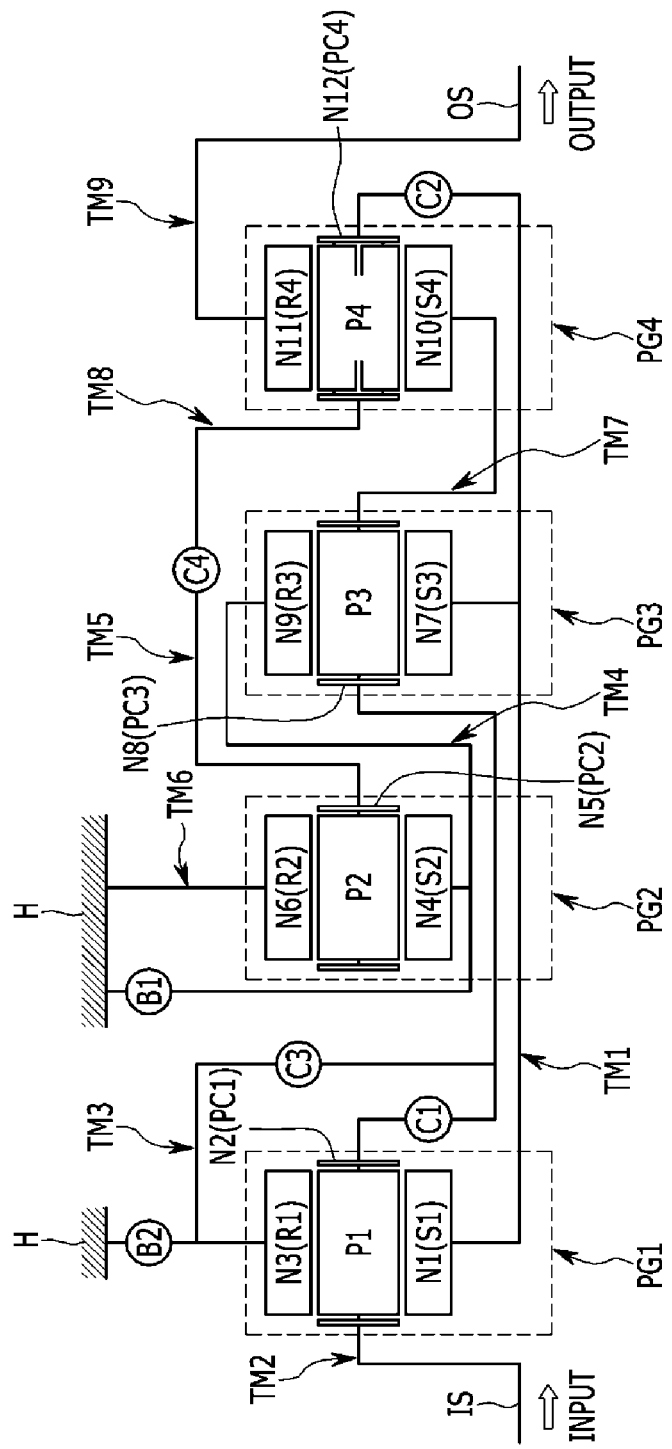
FIG. 1 is a configuration diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

Further, in the following detailed description, names of constituents, which are in the same relationship, are divided into "the first", "the second", and the like, but the present invention is not limited to the order in the following description.

FIG. 1 is a configuration diagram of a planetary gear train according to an exemplary embodiment of the present invention.

Referring to FIG. 1, the planetary gear train according to the exemplary embodiment of the present invention includes first, second, third, and fourth planetary gear sets PG1, PG2, PG3, and PG4 which are coaxially disposed, an input shaft IS, an output shaft OS, nine rotating shafts TM1 to TM9 which directly connect respective rotating elements of the first, second, third, and fourth planetary gear sets PG1, PG2, PG3, and PG4, six control elements C1 to C4 and B1 to B2, and a transmission housing H.

Further, rotational power inputted from the input shaft IS is changed in speed by complementary operations of the first, second, third, and fourth planetary gear sets PG1, PG2, PG3, and PG4, and then outputted through the output shaft OS.

The respective simple planetary gear sets are disposed in the order of the first, second, third, and fourth planetary gear sets PG1, PG2, PG3, and PG4 from an engine.

The input shaft IS is an input member, and rotational power from a crankshaft of the engine is converted into torque by a torque converter, and the torque is inputted.

The output shaft OS is an output member, and disposed coaxially with the input shaft IS to transmit the driving power, which is changed in speed, to a driving shaft through a differential apparatus.

The first planetary gear set PG1 is a single pinion planetary gear set, and includes rotating elements including a first sun gear S1 which is a first rotating element N1, a first planet carrier PC1 which is a second rotating element N2 for supporting a first pinion P1 that externally engages with the first sun gear S1 that is the first rotating element N1, and a first ring gear R1 which is a third rotating element N3 that internally engages with the first pinion P1.

The second planetary gear set PG2 is a single pinion planetary gear set, and includes a second sun gear S2 which is a fourth rotating element N4, a second planet carrier PC2 which is a fifth rotating element N5 for supporting a second pinion P2 that externally engages with the second sun gear S2 that is the fourth rotating element N4, and a second ring gear R2 which is a sixth rotating element N6 that internally engages with the second pinion P2.

The third planetary gear set PG3 is a single pinion planetary gear set, and includes a third sun gear S3 which is a seventh rotating element N7, a third planet carrier PC3 which is an eighth rotating element N8 for supporting a third pinion P3 that externally engages with the third sun gear S3 that is the seventh rotating element N7, and a third ring gear R3 which is a ninth rotating element N9 that internally engages with the third pinion P3.

The fourth planetary gear set PG4 is a double pinion planetary gear set and includes a fourth sun gear S4 which is a tenth rotating element N10, a fourth ring gear R4 which is an eleventh rotating element N11 that internally engages a fourth pinion P4 that externally engages with the fourth sun gear S4 that is the tenth rotating element N10, and a fourth planet carrier PC4 which is a twelfth rotating element N12 for supporting the fourth pinion P4.

The first, second, third, and fourth planetary gear sets PG1, PG2, PG3, and PG4 are operated while retaining the total of nine rotating shafts TM1 to TM9 in a state in which the first rotating element N1 is directly connected with the seventh rotating element N7, the fourth rotating element N4 is directly connected to the ninth rotating element N9, and the eighth rotating element N8 is directly connected with the tenth rotating element N10.

The configurations of the nine rotating shafts TM1 to TM9 will be described below.

The first rotating shaft TM1 includes the first rotating element N1 (the first sun gear) and the seventh rotating element N7 (the third sun gear S3).

The second rotating shaft TM2 includes the second rotating element N2 (the first planet carrier PC1), and is directly connected with the input shaft IS so as to be continuously operated as an input element.

The third rotating shaft TM3 includes the third rotating element N3 (the first ring gear R1), and is selectively connected with the transmission housing H.

The fourth rotating shaft TM4 includes the fourth rotating element N4 (the second sun gear S2) and the ninth rotating element N9 (the third ring gear R3), and is selectively connected with the transmission housing H.

The fifth rotating shaft TM5 includes the fifth rotating element N5 (the second planet carrier PC2).

The sixth rotating shaft TM6 includes the sixth rotating element N6 (the second ring gear R2), and is directly connected with the transmission housing H so as to be continuously operated as a fixation element.

The seventh rotating shaft TM7 includes the eighth rotating element N8 (the third planet carrier PC3) and the tenth rotating element N10 (the fourth sun gear S4), and is selectively connected with the second rotating shaft TM2 and the third rotating shaft TM3.

The eighth rotating shaft TM8 includes the twelfth rotating element N12 (the fourth planet carrier PC4), and is selectively connected with the first rotating shaft TM1 and the fifth rotating shaft TM5.

The ninth rotating shaft TM9 includes the eleventh rotating element N11 (the fourth ring gear R4), and is directly connected with the output shaft OS so as to be continuously operated as an output element.

Further, the four clutches C1, C2, C3, and C4, which are control elements, are disposed at portions where the rotating shafts of the rotating shafts TM1 to TM9 are selectively connected to each other.

In addition, the two brakes B1 and B2, which are control elements, are disposed at portions where the rotating shafts of the rotating shafts TM1 to TM9 are selectively connected with the transmission housing H.

Positions at which the six control elements C1 to C4 and B1 to B2 are disposed will be described below.

The first clutch C1 is disposed between the second rotating shaft TM2 and the seven rotating shaft TM7, and allows the second rotating shaft TM2 and the seven rotating shaft TM7 to be selectively integrated with each other.

The second clutch C2 is disposed between the first rotating shaft TM1 and the eighth rotating shaft TM8, and allows the first rotating shaft TM1 and the eighth rotating shaft TM8 to be selectively integrated with each other.

The third clutch C3 is interposed between the third rotating shaft TM3 and the seventh rotating shaft TM7, and allows the third rotating shaft TM3 and the seventh rotating shaft TM7 to be selectively integrated with each other.

The fourth clutch C4 is interposed between the fifth rotating shaft TM5 and the eighth rotating shaft TM8, and allows the fifth rotating shaft TM5 and the eighth rotating shaft TM8 to be selectively integrated with each other.

The first brake B1 is interposed between the fourth rotating shaft TM4 and the transmission housing H, and allows the fourth rotating shaft TM4 to be selectively operated as a fixation element.

The second brake B2 is interposed between the third rotating shaft TM3 and the transmission housing H, and allows the third rotating shaft TM3 to be selectively operated as a fixation element.

The control elements, which include the first, second, third and fourth clutches C1, C2, C3, and C4 and the first and second brakes B1 and B2 as described above, may be a multi-plate hydraulic frictional coupling unit that is frictionally coupled by hydraulic pressure.

FIG. 2 is an operation chart of control elements at each speed stage in the planetary gear train according to an exemplary embodiment of the present invention.

As shown in FIG. 2, three control elements are operated at each speed stage in the planetary gear train according to the exemplary embodiment of the present invention.

At a gear shift stage for a first forward speed D1, the third and fourth clutches C3 and C4 and the first brake B1 are operated simultaneously. Therefore, in a state in which the third rotating shaft TM3 is connected with the seventh rotating shaft TM7 by the operation of the third clutch C3, and the fifth rotating shaft TM5 is connected with the eighth rotating shaft TM8 by the operation of the fourth clutch C4, power is inputted to the second rotating shaft TM2. In addition, as the fourth rotating shaft TM4 is operated as a fixation element by the operation of the first brake B1 in a state in which the sixth rotating shaft TM6 is continuously operated as a fixation element, the first forward speed is carried out and power is outputted through the ninth rotating shaft TM9.

At a gear shift stage for a second forward speed D2, the fourth clutch C4 and the first and second brakes B1 and B2 are operated simultaneously. Therefore, in a state in which the fifth rotating shaft TM5 is connected with the eighth rotating shaft TM8 by the operation of the fourth clutch C4, power is inputted to the second rotating shaft TM2. In addition, as the fourth rotating shaft TM4 is operated as a fixation element by the operation of the first brake B1 and the third rotating shaft TM2 is operated as a fixation element by the operation of the second brake B2 in a state in which the sixth rotating shaft TM6 is continuously operated as a fixation element, the second forward speed is carried out and power is outputted through the ninth rotating shaft TM9.

At a gear shift stage for a third forward speed D3, the first and fourth clutches C1 and C4 and the second brake B2 are operated simultaneously. Therefore, in a state in which the second rotating shaft TM2 is connected with the seventh rotating shaft TM7 by the operation of the first clutch C1 and the fifth rotating shaft TM5 is connected with the eighth rotating shaft TM8 by the operation of the fourth clutch C4, power is inputted to the second rotating shaft TM2. In addition, as the third rotating shaft TM3 is operated as a fixation element by the operation of the second brake B2 in a state in which the sixth rotating shaft TM6 is continuously operated as a fixation element, the third forward speed is carried out and power is outputted through the ninth rotating shaft TM9.

At a gear shift stage for a fourth forward speed D4, the first, second, and fourth clutches C1, C2, and C4 are operated simultaneously. Therefore, in a state in which the second rotating shaft TM2 is connected with the seventh rotating shaft TM7 by the operation of the first clutch C1, the first rotating shaft TM1 is connected with the eighth rotating shaft TM8 by the operation of the second clutch C2, and the fifth rotating shaft TM5 is connected with the eighth rotating shaft TM8 by the operation of the fourth clutch C4, power is inputted to the second rotating shaft TM2. In addition, as the sixth rotating shaft TM6 is continuously operated as a fixation element, the fourth forward speed is carried out and power is outputted through the ninth rotating shaft TM9.

At a gear shift stage for a fifth forward speed D5, the second, third, and fourth clutches C2, C3, and C4 are operated simultaneously. Therefore, in a state in which the first rotating shaft TM1 is connected with the eighth rotating shaft TM8 by the operation of the second clutch C2, the third rotating shaft TM3 is connected with the seventh rotating shaft TM7 by operation of the third clutch C3, and the fifth rotating shaft TM5 is connected with the eighth rotating shaft TM8 by the operation of the fourth clutch C4, power is inputted to the second rotating shaft TM2. In addition, as the sixth rotating shaft TM6 is continuously operated as a fixation element, the fifth forward speed is carried out and power is outputted through the ninth rotating shaft TM9.

At a gear shift stage for a sixth forward speed D6, the first, second, and third clutches C1, C2, and C3 are operated simultaneously. Therefore, in a state in which the second rotating shaft TM2 is connected with the seventh rotating shaft TM7 by the operation of the first clutch C1, the first rotating shaft TM1 is connected with the eighth rotating shaft TM8 by the operation of the second clutch C2, and the third rotating shaft TM3 is connected with the seventh rotating shaft TM7 by the operation of the third clutch C3, power is inputted to the second rotating shaft TM2. In addition, as the sixth rotating shaft TM6 is continuously operated as a fixation element, the sixth forward speed is carried out and power is outputted through the ninth rotating shaft TM9.

At a gear shift stage for a seventh forward speed D7, the second and third clutches C2 and C3 and the first brake B1 are operated simultaneously. Therefore, in a state in which the first rotating shaft TM1 is connected with the eighth rotating shaft TM8 by the operation of the second clutch C2 and the third rotating shaft TM3 is connected with the seventh rotating shaft TM7 by the operation of the third clutch C3, power is inputted to the second rotating shaft TM2. In addition, as the fourth rotating shaft TM4 is operated as a fixation element by the operation of the first brake B1 in a state in which the sixth rotating shaft TM6 is continuously operated as a fixation element, the seventh forward speed is carried out and power is outputted through the ninth rotating shaft TM9.

At a gear shift stage for a eighth forward speed D8, the second and third clutches C2 and C3 and the second brake B2 are operated simultaneously. Therefore, in a state in which the first rotating shaft TM1 is connected with the eighth rotating shaft TM8 by the operation of the second clutch C2 and the third rotating shaft TM3 is connected with the seventh rotating shaft TM7 by the operation of the third clutch C3, power is inputted to the second rotating shaft TM2. In addition, as the third rotating shaft TM3 is operated as a fixation element by the operation of the second brake B2 in a state in which the sixth rotating shaft TM6 is continuously operated as a fixation element, the eighth forward speed is carried out and power is outputted through the ninth rotating shaft TM9.

At a gear shift stage for a ninth forward speed D9, the second clutch C2 and the first and second brakes B1 and B2 are operated simultaneously. Therefore, in a state in which the first rotating shaft TM1 is connected with the eighth rotating shaft TM8 by the operation of the second clutch C2, power is inputted to the second rotating shaft TM2. In addition, as the fourth rotating shaft TM4 is operated as a fixation element by the operation of the first brake B1 and the third rotating shaft TM2 is operated as a fixation element by the operation of the second brake B2 in a state in which the sixth rotating shaft TM6 is continuously operated as a fixation element, the ninth forward speed is carried out and power is outputted through the ninth rotating shaft TM9.

At a gear shift stage for a tenth forward speed D10, the first and second clutches C1 and C2 and the first brake B1 are operated simultaneously. Therefore, in a state in which the second rotating shaft TM2 is connected with the seventh rotating shaft TM7 by the operation of the first clutch C1, the first rotating shaft TM1 is connected with the eighth rotating shaft TM8 by the operation of the second clutch C2, power is inputted to the second rotating shaft TM2. In addition, as the fourth rotating shaft TM4 is operated as a fixation element by the operation of the first brake B1 in a state in which the sixth rotating shaft TM6 is continuously operated as a fixation element, the tenth forward speed is carried out and power is outputted through the ninth rotating shaft TM9.

At a reverse speed stage REV, the third and fourth clutches C3 and C4 and the second brake B2 are operated simultaneously. Therefore, power is inputted to the second rotating shaft TM2 in a state in which the third rotating shaft TM3 is connected with the seventh rotating shaft TM7 by the operation of the third clutch C3 and the fifth rotating shaft TM5 is connected with the eighth rotating shaft TM8 by the operation of the fourth clutch C4. As the third rotating shaft TM3 is operated as a fixation element by the operation of the second brake B2 in a state in which the sixth rotating shaft TM6 is continuously operated as a fixation element, a reverse speed is carried out and power is outputted through the ninth rotating shaft TM9.

The planetary gear train according to the exemplary embodiment of the present invention may implement the gear shift stages for ten forward speeds and one reverse speed by operating and controlling the four planetary gear sets PG1, PG2, PG3, and PG4 using the four clutches C1, C2, C3, and C4 and the two brakes B1 and B2.

In addition, all ratios between the gear shift stages are 1.2 or more except for 5/6 forward gear shift stages, and uniformity (linearity of graph) is ensured, thereby improving drivability such as acceleration before and after the gear shift operations, and a sense of rhythm of an engine speed.

In addition, a span of a gear shift ratio is 9.0 or more, thereby maximizing driving efficiency of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
    an input shaft which receives power from an engine;
    an output shaft which outputs power changed in speed;
    a first planetary gear set having first, second, and third rotating elements;
    a second planetary gear set having fourth, fifth, and sixth rotating elements;
    a third planetary gear set having seventh, eighth, and ninth rotating elements;
    a fourth planetary gear set having tenth, eleventh, and twelfth rotating elements; and
    six control elements which are disposed between the rotating elements, and disposed at portions where the rotating elements are selectively connected to a transmission housing,
    wherein the input shaft is directly connected with the second rotating element,
    the output shaft is directly connected with the eleventh rotating element,
    the first rotating element is directly connected with the seventh rotating element,
    the sixth rotating element is directly connected with the transmission housing,
    the fourth rotating element is directly connected with the ninth rotating element,
    the eighth rotating element is directly connected with the tenth rotating element, and
    at least ten forward speeds and one reverse speed are implemented by operations of three control elements among the six control elements,
    wherein
        the third rotating element and the fourth rotating element are selectively connected with the transmission housing,
        the second rotating element is selectively connected with the eighth rotating element,
        the seventh rotating element is selectively connected with the twelfth rotating element, the third rotating element is selectively connected with the eighth rotating element, and
the fifth rotating element is selectively connected with the twelfth rotating element.

2. The planetary gear train of claim 1, wherein
the first, second, and third rotating elements of the first planetary gear set are a sun gear, a planet carrier, and a ring gear, respectively,
the fourth, fifth, and sixth rotating elements of the second planetary gear set are a sun gear, a planet carrier, and a ring gear, respectively,
the seventh, eighth, and ninth rotating elements of the third planetary gear set are a sun gear, a planet carrier, and a ring gear, respectively, and
the tenth, eleventh, and twelfth rotating elements of the fourth planetary gear set are a sun gear, a ring gear, and a planet carrier, respectively.

3. A planetary gear train of an automatic transmission for a vehicle, the planetary gear train comprising:
an input shaft which receives power from an engine;
an output shaft which outputs power changed in speed;
a first planetary gear set having first, second, and third rotating elements;
a second planetary gear set having fourth, fifth, and sixth rotating elements;
a third planetary gear set having seventh, eighth, and ninth rotating elements;
a fourth planetary gear set having tenth, eleventh, and twelfth rotating elements;
six control elements which are disposed between the rotating elements, and disposed at portions where the rotating elements are selectively connected to a transmission housing;
a first rotating shaft including the first rotating element and the seventh rotating element;
a second rotating shaft including the second rotating element and directly connected with the input shaft;
a third rotating shaft including the third rotating element and selectively connected with the transmission housing;
a fourth rotating shaft including the fourth rotating element and the ninth rotating element and selectively connected with the transmission housing;
a fifth rotating shaft including the fifth rotating element;
a sixth rotating shaft including the sixth rotating element and directly connected with the transmission housing;
a seventh rotating shaft including the eighth rotating element and the tenth rotating element and selectively connected with the second rotating shaft and the third rotating shaft;
an eighth rotating shaft including the twelfth rotating element and selectively connected with the first rotating shaft and the fifth rotating shaft; and
a ninth rotating shaft including the eleventh rotating element and directly connected with the output shaft to be continuously operated as an output element.

4. The planetary gear train of claim 3, wherein
the first planetary gear set is a single pinion planetary gear set in which the first rotating element is a first sun gear, the second rotating element is a first planet carrier, and the third rotating element is a first ring gear,
the second planetary gear set is a single pinion planetary gear set in which the fourth rotating element is a second sun gear, the fifth rotating element is a second planet carrier, and the sixth rotating element is a second ring gear,
the third planetary gear set is a single pinion planetary gear set in which the seventh rotating element is a third sun gear, the eighth rotating element is a third planet carrier, and the ninth rotating element is a third ring gear, and
the fourth planetary gear set is a double pinion planetary gear set in which the tenth rotating element is a fourth sun gear, the eleventh rotating element is a fourth ring gear, and the twelfth rotating element is a fourth planet carrier.

5. The planetary gear train of claim 3, wherein the six control elements include:
a first clutch which selectively connects the second rotating shaft and the seventh rotating shaft;
a second clutch which selectively connects the first rotating shaft and the eighth rotating shaft;
a third clutch which selectively connects the third rotating shaft and the seventh rotating shaft;
a fourth clutch which selectively connects the fifth rotating shaft and the eighth rotating shaft;
a first brake which selectively connects the fourth rotating shaft and the transmission housing; and
a second brake which selectively connects the third rotating shaft and the transmission housing.

6. The planetary gear train of claim 5, wherein gear shift stages, which are implemented by selectively operating the six control elements, include:
a first forward gear shift stage which is implemented by simultaneously operating the third and fourth clutches and the first brake;
a second forward gear shift stage which is implemented by simultaneously operating the fourth clutch and the first and second brakes;
a third forward gear shift stage which is implemented by simultaneously operating the first and fourth clutches and the second brake;
a fourth forward gear shift stage which is implemented by simultaneously operating the first, second, and fourth clutches;
a fifth forward gear shift stage which is implemented by simultaneously operating the second, third, and fourth clutches;
a sixth forward gear shift stage which is implemented by simultaneously operating the first, second, and third clutches;
a seventh forward gear shift stage which is implemented by simultaneously operating the second and third clutches and the first brake;
an eighth forward gear shift stage which is implemented by simultaneously operating the second and third clutches and the second brake;
a ninth forward gear shift stage which is implemented by simultaneously operating the second clutch and the first and second brakes;
a tenth forward gear shift stage which is implemented by simultaneously operating the first and third clutches and the first brake; and
a reverse gear shift stage which is implemented by simultaneously operating the third and fourth clutches and the second brake.

7. A planetary gear train of an automatic transmission for a vehicle, the planetary gear train comprising:
an input shaft which receives power from an engine;
an output shaft which outputs power changed in speed;
a first planetary gear set which is a single pinion planetary gear set and has first, second, and third rotating elements;

a second planetary gear set which is a single pinion planetary gear set and has fourth, fifth, and sixth rotating elements;

a third planetary gear set which is a single pinion planetary gear set and has seventh, eighth, and ninth rotating elements;

a fourth planetary gear set which is a double pinion planetary gear set and has tenth, eleventh, and twelfth rotating elements;

a first rotating shaft including the first rotating element and the seventh rotating element;

a second rotating shaft including the second rotating element and directly connected with the input shaft;

a third rotating shaft including the third rotating element and selectively connected with a transmission housing;

a fourth rotating shaft including the fourth rotating element and the ninth rotating element and selectively connected with the transmission housing;

a fifth rotating shaft including the fifth rotating element;

a sixth rotating shaft including the sixth rotating element and directly connected with the transmission housing;

a seventh rotating shaft including the eighth rotating element and the tenth rotating element and selectively connected with the second rotating shaft and the third rotating shaft;

an eighth rotating shaft including the twelfth rotating element and selectively connected with the first rotating shaft and the fifth rotating shaft;

a ninth rotating shaft including the eleventh rotating element and directly connected with the output shaft to be continuously operated as an output element;

a first clutch which selectively connects the second rotating shaft and the seventh rotating shaft;

a second clutch which selectively connects the first rotating shaft and the eighth rotating shaft and;

a third clutch which selectively connects the third rotating shaft and the seventh rotating shaft;

a fourth clutch which selectively connects the fifth rotating shaft and the eighth rotating shaft;

a first brake which selectively connects the fourth rotating shaft and the transmission housing; and a second brake which selectively connects the third rotating shaft and the transmission housing.

8. The planetary gear train of claim 7, wherein the first planetary gear set is configured that the first rotating element is a first sun gear, the second rotating element is a first planet carrier, and the third rotating element is a first ring gear, the second planetary gear set is configured that the fourth rotating element is a second sun gear, the fifth rotating element is a second planet carrier, and the sixth rotating element is a second ring gear, the third planetary gear set is configured that the seventh rotating element is a third sun gear, the eighth rotating element is a third planet carrier, and the ninth rotating element is a third ring gear, and the fourth planetary gear set is configured that the tenth rotating element is a fourth sun gear, the eleventh rotating element is a fourth ring gear, and the twelfth rotating element is a fourth planet carrier.

9. The planetary gear train of claim 7, wherein gear shift stages, which are implemented by selectively operating the four clutches and the two brakes, include:

a first forward gear shift stage which is implemented by simultaneously operating the third and fourth clutches and the first brake;

a second forward gear shift stage which is implemented by simultaneously operating the fourth clutch and the first and second brakes;

a third forward gear shift stage which is implemented by simultaneously operating the first and fourth clutches and the second brake;

a fourth forward gear shift stage which is implemented by simultaneously operating the first, second, and fourth clutches;

a fifth forward gear shift stage which is implemented by simultaneously operating the second, third, and fourth clutches;

a sixth forward gear shift stage which is implemented by simultaneously operating the first, second, and third clutches;

a seventh forward gear shift stage which is implemented by simultaneously operating the second and third clutches and the first brake;

an eighth forward gear shift stage which is implemented by simultaneously operating the second and third clutches and the second brake;

a ninth forward gear shift stage which is implemented by simultaneously operating the second clutch and the first and second brakes;

a tenth forward gear shift stage which is implemented by simultaneously operating the first and third clutches and the first brake; and a reverse gear shift stage which is implemented by simultaneously operating the third and fourth clutches and the second brake.

* * * * *